United States Patent
Yvart et al.

(10) Patent No.: US 8,562,768 B2
(45) Date of Patent: Oct. 22, 2013

(54) SOLID COMPOUNDS, SELF-SUSTAINING COMBUSTION HYDROGEN GENERATORS CONTAINING BORAZANE AND/OR POLYAMINOBORANE AND AT LEAST ONE INORGANIC OXIDANT, AND METHOD FOR GENERATING HYDROGEN

(75) Inventors: Pierre Yvart, Vert le Petit (FR); Joel Renouard, Saint Martin en Biere (FR); Helene Blanchard, Bourg la Reine (FR); Hugues Rocton, Vert le Petit (FR)

(73) Assignee: Herakles, Le Haillan (FR)

( * ) Notice: Subject to any disclaimer, the term of this patent is extended or adjusted under 35 U.S.C. 154(b) by 335 days.

(21) Appl. No.: 12/934,885

(22) PCT Filed: Apr. 16, 2009

(86) PCT No.: PCT/FR2009/050705
§ 371 (c)(1),
(2), (4) Date: Sep. 27, 2010

(87) PCT Pub. No.: WO2009/138629
PCT Pub. Date: Nov. 19, 2009

(65) Prior Publication Data
US 2011/0027168 A1 Feb. 3, 2011

(30) Foreign Application Priority Data
Apr. 16, 2008 (FR) .................................. 08 52540

(51) Int. Cl.
*C30B 13/00* (2006.01)
*C30B 21/04* (2006.01)
*C30B 28/08* (2006.01)
*C30B 19/00* (2006.01)
*D03D 23/00* (2006.01)
*D03D 43/00* (2006.01)

(52) U.S. Cl.
USPC ......... 149/109.2; 149/45; 149/61; 149/108.4; 149/109.4; 149/109.6

(58) Field of Classification Search
USPC ................ 149/1, 45, 61, 108.4, 109.2, 109.4, 149/109.6
See application file for complete search history.

(56) References Cited

U.S. PATENT DOCUMENTS 4,157,927 A * 6/1979 Chew et al. ..................... 149/22
4,468,263 A * 8/1984 Artz et al. ....................... 149/22

FOREIGN PATENT DOCUMENTS

FR 2834710 7/2003
FR 2834710 A1 * 7/2003 ................. 149/109.2

OTHER PUBLICATIONS

Baumann J, et al.; "Thermal decomposition of polymeric aminoborane (H2BNH2)x under hydrogen release", Thermochimica Acta, Elsevier Science vol. 430 (2005), No. 1-2, pp. 9-14.

* cited by examiner

*Primary Examiner* — James McDonough
(74) *Attorney, Agent, or Firm* — Hamre, Schumann, Mueller & Larson, P.C.

(57) ABSTRACT

The main subject of the present invention are solid compounds capable of generating hydrogen by a self-sustaining combustion reaction. Their composition comprises borazane and/or polyaminoborane and at least one inorganic oxidant, advantageously chosen from ammonium nitrate, alkali metal nitrates, alkaline-earth metal nitrates, metal nitrates, metal oxides, oxidants of the family of dinitramines and mixtures thereof. It also relates to the generation of hydrogen by self-sustaining combustion of at least one such compound.

15 Claims, No Drawings

SOLID COMPOUNDS, SELF-SUSTAINING COMBUSTION HYDROGEN GENERATORS CONTAINING BORAZANE AND/OR POLYAMINOBORANE AND AT LEAST ONE INORGANIC OXIDANT, AND METHOD FOR GENERATING HYDROGEN

The main subjects of the present invention are solid compounds that generate hydrogen by self-sustaining combustion and also a process for generating hydrogen based on the combustion of said compounds.

The present invention lies within the field of the production of hydrogen, a gas widely used as a fuel or reducing agent in numerous industrial processes and devices. The main subject of the present invention is novel solid compounds which decompose to generate hydrogen by a self-sustaining combustion reaction. The invention also relates to the use of these novel compounds for therefore generating hydrogen, more particularly in the context of supplying proton exchange membrane fuel cells with hydrogen.

A person skilled in the art, who wishes in particular to replace the batteries of portable electronic systems, such as telephones and computers, has the permanent concern of seeking novel solid compounds which generate hydrogen by combustion, and which, as closely as possible, meet the following specifications:

stability over time, ability to burn at a sufficiently high temperature for the combustion reaction to be self-sustaining and therefore uninterrupted (the compounds must be able to be completely consumed in one step), while generating gases (therefore including hydrogen) which have an acceptable temperature in the context of their use, a good mass yield of hydrogen, and during the combustion, generate the least possible amount of harmful (reactive and/or toxic) species.

The Applicant has already proposed compounds of this type: solid compounds which decompose to generate hydrogen by a self-sustaining combustion reaction, after the combustion is initiated by an appropriate heat source. The Applicant has more particularly described such compounds in patent applications FR 2 823 203, FR 2 845 376, FR 2 845 377 and FR 2 857 358. In their composition, these compounds comprise an inorganic hydride and an inorganic oxidant; the term "inorganic" meaning carbon-free.

The Applicant has in particular tested such compounds, containing:

on the one hand, an alkali metal borohydride, such as $NaBH_4$ or $LiBH_4$ or an alkaline-earth metal borohydride, such as $Mg(BH_4)_2$; and on the other hand, an inorganic oxidant, such as ammonium perchlorate ($NH_4ClO_4$), strontium nitrate ($Sr(NO_3)_2$), ammonium nitrate ($NH_4NO_3$) and ammonium dinitramine (ADN) ($NH_4N(NO_2)_2$).

The Applicant has demonstrated that the combustion of such compounds generates hydrogen with a mass yield of up to 12%.

These compounds from the prior art correspond well to some of the requirements of the above specifications, but they have the drawback of generating highly reactive species capable of constituting a danger for the user. Furthermore, a person skilled in the art knows that these compounds, especially those containing $NaBH_4$ or $LiBH_4$ are very hygroscopic, and therefore require specific packagings. A person skilled in the art also knows that these compounds have the drawback of exhibiting a sensitivity to impact and to friction.

From another point of view, the advantage of the molecule borazane (or ammonia borane) for generating hydrogen by decomposition at low temperature (from 343 K) is known to a person skilled in the art.

U.S. Pat. No. 7,285,142 thus describes the generation of hydrogen by low-temperature pyrolysis of borazane ($NH_3BH_3$+heat->BN+3$H_2$); which pyrolysis has the drawback of generating undesirable species, such as monomeric or polymeric aminoborane, borazine, diborane.

U.S. Pat. No. 4,157,927 describes pellets constituted of an aminoborane such as borazane $NH_3BH_3$ or of an aminoborane derivative (for example, of formula $H_2B(NH_3)_2X$ (where X is a halogen)) and of a compound or mixture, such as $LiAlH_4$ or $Fe_2O_3/NaBH_4$.

Patent application US 2008/0035252 describes a pyrotechnic charge containing borazane arranged in a borazane-based container.

It is furthermore known (J. Baumann et al.: "Thermal decomposition of polymeric aminoborane $(H_2BNH_2)_x$ under hydrogen release", Thermochimica acta, 430 (2005) 9-14) that the first step of decomposition of borazane ($NH_3BH_3$) at temperature (below 370 K), results in an aminoborane polymer, polyaminoborane, of chemical formula $(H_2BNH_2)_x$. This polymer is a white non-crystalline solid that is stable up to at least 380 K. Between 380 and 500 K, $(H_2BNH_2)_x$ decomposes producing almost 1 mol of $H_2$ per mol of $H_2BNH_2$.

The synthesis and characterization of polyaminoborane, $(H_2BNH_2)_x$, has also been described by Dong-Pyo Kim et al., in "Synthesis and characterization of poly(aminoborane) as a new boron nitride precursor", Polymers for Advanced Technologies, Volume 10, Issue 12, pages 702-712. Its decomposition at 473 K to boron nitride (BN) with production of hydrogen has also been described.

Incidentally, it should be noted that the polyaminoborane polymer, having —$H_2BNH_2$— units, corresponds more exactly to the formula $H_3N$—$(H_2BNH_2)_x$—$BH_3$ with x≥2 (and should not be compared to the diborane diammoniate according to application FR 2 834 710, an ionic complex obtained by reaction of ammonia (gas) and borane (gas)).

In such a context, confident of its mastery of pyrotechnic compositions, the applicant proposes novel solid compounds, capable of generating (by self-sustaining combustion) hydrogen at an advantageous rate. Said novel solid compounds are all the more advantageous since they are weakly hygroscopic, not very sensitive to mechanical attacks and in that their combustion does not generate or generates very few reactive and/or toxic residues (see the examples below).

According to its first subject, the present invention therefore relates to solid compounds capable of generating hydrogen by a self-sustaining combustion reaction (that is to say solid compounds which decompose to generate hydrogen by a self-sustaining combustion reaction, after initiation of this reaction by a suitable heat source; such a heat source is used only to initiate combustion). Said compounds combine in their composition a specific reducing charge: borazane and/or (generally or) polyaminoborane and an inorganic oxidizing charge (at least one inorganic oxidant) (inorganic=carbon-free). This inorganic oxidizing charge ensures the self-sustaining combustion redox reaction.

According to one advantageous variant, said compounds comprise, in their composition:

borazane and/or (generally or) polyaminoborane; and at least one (inorganic) oxidant chosen from ammonium nitrate ($NH_4NO_3$), alkali metal nitrates (such as potassium nitrate: $KNO_3$), alkaline-earth metal nitrates (such as magnesium nitrate: $Mg(NO_3)_2$), metal nitrates (such as strontium nitrate: $Sr(NO_3)_2$), metal oxides (such as ferric oxide: $Fe_2O_3$ or vanadium oxide: $Va_2O_5$), oxidants from the family of dinitramines (such as ammonium dinitramine (ADN): $NH_4N(NO_2)_2$), and mixtures thereof.

As regards said at least one inorganic oxidant (the nature of which is more particularly optimized with reference to the problem of the generation of harmful species), it is very advantageously chosen from:
ammonium, potassium and strontium nitrates;
iron, vanadium and magnesium oxides;
ammonium dinitramine (ADN); and
mixtures thereof.

In a particularly preferred manner, said at least one inorganic oxidant is chosen from ammonium nitrate ($NH_4NO_3$), strontium nitrate ($Sr(NO_3)_2$), and ammonium dinitramine (ADN).

Generally, the compounds of the invention contain a single inorganic oxidant, advantageously of one of the types listed above; very advantageously a single oxidant of one of the preferred types, listed just above. However, the combined presence of at least two inorganic (that is to say carbon-free) oxidants should not be excluded from the scope of the invention.

Characteristically, in order to develop a pyrotechnic reaction, a conventional oxidizing charge and an original reducing charge which comprises, or even which consists of, borazane and/or (advantageously or) polyaminoborane are therefore found combined within the solid compounds of the invention.

According to one variant, the compositions of the invention therefore comprise borazane ($NH_3BH_3$) and at least one inorganic oxidant, in particular as specified above.

According to another variant, the compositions of the invention therefore comprise polyaminoborane ($H_3N$—$(H_2BNH_2)_x$—$BH_3$, $x \geq 2$) and at least one inorganic oxidant, especially as specified above. In other words, a polyaminoborane or aminoborane polymer, in particular as described in the publications identified above, constitutes, according to said other variant, the original reducing charge of the compounds of the invention. Said polyaminoborane constitutes the source of hydrogen of said compounds of the invention. Combined with at least one inorganic oxidant, advantageously with at least one of said inorganic oxidants, the nature of which is specified above, said polyaminoborane has proved capable of burning by a self-sustaining reaction under very advantageous conditions (with reference, in particular, to the specifications presented in the introduction of the present text). One of the advantages of said polyaminoborane is its high decomposition temperature, which is higher than that of borazane (~343 K).

Said polyaminoborane may be obtained by thermal decomposition of solid borazane. Such a decomposition is generally carried out at a temperature below 370 K (see above).

The relative weight proportions of the inorganic oxidant(s) and reducing agent(s) (identified above) within the compounds of the invention are advantageously optimized, very particularly with reference to the mass yield of hydrogen per gram of solid compound and the combustion. It is recalled that a combustion at a temperature which is high enough for the reaction to be self-sustaining, in order to prevent it being interrupted before the complete consumption of the compound is targeted; the temperature of the gases of said combustion having however to be acceptable within the context in question. Within the context of an optimization of said relative proportions of said borazane and/or polyaminoborane (on the one hand) and at least one inorganic oxidant (on the other hand), the composition of the compounds of the invention generally contains said borazane and/or polyaminoborane, on the one hand, and at least one inorganic oxidant, on the other hand, in a weight ratio between 1 and 5. Advantageously, said weight ratio is between 1.5 and 4. The optimization in question is within the competence of a person skilled in the art.

According to one preferred variant, the compounds of the invention do not contain organic matter in their composition (thus they especially do not contain binder, etc.), that is to say that they are solely constituted of mineral compounds. Thus, it is aimed, in particular, to minimize, or even prevent, during the combustion, any formation of CO, $CO_2$, etc.

According to another preferred variant (which is advantageously combined with the preceding one), the compounds of the invention are predominantly constituted of the constituent ingredients identified above, namely borazane and/or polyaminoborane, on the one hand, and said at least one inorganic oxidant, on the other hand; that is to say that said constituent ingredients are in the majority by weight. Within the context of this preferred variant, it is estimated that the sum of the weight contents of borazane and/or aminoborane polymer and of inorganic oxidant(s) (especially as identified above) is greater than 75% by weight, better still 90% by weight, and even 95% by weight, relative to the total weight of the compound. In other words, said borazane and/or polyaminoborane and said at least one inorganic oxidant advantageously represent at least 90%, or even at least 95%, by weight of the weight of said compound.

The compounds of the invention "solely" constituted of said borazane and/or polyaminoborane and at least one inorganic oxidant are particularly preferred. The term "solely" constituted should however be understood to mean "solely constituted" in the strict sense, or which may nevertheless include impurities, present in said borazane and/or said polyaminoborane and/or said at least one inorganic oxidant (crude or purified), or also additives such as stabilizers. Such additives may be commercial products. In other words, said borazane and/or said polyaminoborane and said at least one inorganic oxidant very advantageously represent almost 100%, or even 100%, by weight of the weight of said compounds.

The solid compounds of the invention are compacted materials which have a given geometric shape. Preferably, they are in the form of grains, pellets or blocks. Said grains, pellets or blocks have any shape, for example spherical, ovoid or cylindrical shape. The pellets may or may not have a constant thickness and therefore any peripheral geometry, for example circular, elliptical, square or rectangular, etc. The grains generally have a mass of a few milligrams, the pellets a mass of a few tenths of a gram to a few grams and the blocks a mass of a few tens of grams to a few hundred grams.

The inventors have observed that the compounds of the invention make it possible to attain a theoretical mass yield of hydrogen of 12%. Obviously, said yield may advantageously be optimized depending on the exact nature and the relative proportions of the constituents of said compounds.

The processes for obtaining the solid compounds are processes similar to those of the prior art, especially described in the patent applications identified in the introduction of the present text. A person skilled in the art is perfectly familiar with such processes for obtaining solid compounds (from powders), in this case the solid compounds of the invention, the composition of which contains, characteristically, borazane and/or polyaminoborane and at least one inorganic oxidant.

Such processes may be carried out by a dry route or via a wet route.

Thus, a homogeneous, granular or pulverulent, mixture of the various constituents (said borazane and/or said polyaminoborane+said at least one inorganic oxidant, advantageously the predominant, or even (almost) sole constituents) may be, for example, agglomerated by compacting in a pressing container having the shape and dimensions desired for the final compounds.

Thus, according to another mode of implementation, the constituents in question may be put into solution and/or suspension in a liquid medium. The solution and/or suspension obtained is homogenized and placed in a mold having suitable dimensions. The liquid is then removed, for example by evaporation, which results, within said mold, in a compact compound being obtained.

Incidentally, it is noted here that the mixtures of powders (comprising the borazane and/or the polyaminoborane, in the pulverulent form+at least one inorganic oxidant, in the pulverulent form), which are precursors of the compact compounds of the invention (starting material for the implementation of the processes by analogy mentioned above), constitute another subject of the present invention. The mixtures in question are pulverulent solid compositions, precursors of the solid compounds of the invention, as described above. Characteristically, said pulverulent solid compositions contain borazane and/or polyaminoborane (in the form of powder) and at least one inorganic oxidant, advantageously of one of the types specified above (also in the form of powder).

Another subject of the present invention is a process for generating hydrogen, which comprises the self-sustaining combustion of at least one solid compound. Said combustion process, which is known per se, is characteristically carried out with at least one compound of the invention, as described above (compound having a composition which contains borazane and/or polyaminoborane and at least one inorganic oxidant, advantageously of one of the types specified above).

Said method, which is known per se, generally comprises the following steps:
- a homogeneous, pulverulent or granular, solid composition is first prepared, which comprises said borazane and/or (advantageously or) said polyaminoborane and said at least one oxidant;
- this composition is then agglomerated with appropriate means (according to an appropriate process), for example those mentioned above, in order to form a compound in the form of a compact material; then
- the compact material (the compound) is placed in a combustion chamber which is purged under inert gas or under vacuum. When the dead volume is small (the volume remaining in the chamber after the compact material has been placed therein), such a purge may in practice be unnecessary;
- the combustion of the compact material (of the compound) is then initiated using an appropriate heat source, which gives rise to the self-sustaining combustion of the material with generation of hydrogen until the end of combustion. The appropriate heat sources allowing the initiation of combustion by the "Joule" effect are well known to a person skilled in the art, particularly electrical initiators. The use of a nickel-chromium ignition filament placed in contact or coated with the compound to be initiated, to which a sufficient voltage and a current of sufficient intensity (and therefore a sufficient power) are applied, is perfectly suitable. For a given voltage, it is possible for example to increase the intensity of the current until combustion is initiated. In certain cases, to promote the ignition, a conventional relay ignition powder, well known to a person skilled in the art, can be used between the filament and the compact material.

The above process generally comprises the preparation and combustion of several compounds.

According to one advantageous implementation variant of said process, the hot gases generated by the self-sustaining combustion (of the compact material) of at least one compound of the invention circulate across at least one additional charge containing borazane and/or polyaminoborane, or even constituted solely of borazane and/or of polyaminoborane. The thermal energy provided by said hot gases leads to the decomposition of said at least one additional charge which thus contributes to the production of hydrogen. More generally, within the context of said variant, a heat exchange is carried out between said hot gases and said at least one additional charge for the decomposition of said at least one additional charge.

The process of the invention—process for generating hydrogen comprising the combustion of the solid compounds described above—is advantageously carried out in order to supply a proton exchange membrane fuel cell with hydrogen. Such a fuel cell, familiar to a person skilled in the art, comprises at least one electrochemical cell and a pyrotechnic hydrogen generator. Within the context of the process of the invention, the operation of said generator is based on the combustion of solid compounds of the invention.

The process of the invention may entirely be analyzed in terms of use of the compounds of the invention.

The examples below illustrate, in no way limitingly, the present invention. They demonstrate the great advantage thereof.

IA. EXAMPLES OF COMPOSITIONS ACCORDING TO THE INVENTION (CONTAINING POLYAMINOBORANE) AND RESULTS OF THERMODYNAMIC CALCULATIONS

TABLE 1

| Polyaminoborane/potassium nitrate compound | | | |
| --- | --- | --- | --- |
| | Percentage by weight | | |
| Compound of the invention | | | |
| Polyaminoborane | 60 | 70 | 80 |
| Potassium nitrate | 40 | 30 | 20 |
| Combustion temperature at atmospheric pressure (1.01 bar) | | | |
| T (K) | 1237 | 1184 | 1141 |
| Combustion products present in an amount greater than 1% | | | |
| Nature | | | |
| $KBO_2(g)$ | 32.4 | 24.3 | 16.2 |
| $N_2(g)$ | 14.6 | 10.9 | 7.2 |
| $BN(s)$ | 35.5 | 48.2 | 60.9 |
| $B_2O_3(l)$ | 8.8 | 6.5 | 4.2 |

TABLE 2

Polyaminoborane/ammonium nitrate compound

| Compound of the invention | Percentage by weight | | |
|---|---|---|---|
| Polyaminoborane | 60 | 70 | 80 |
| Ammonium nitrate | 40 | 30 | 20 |
| Combustion temperature at atmospheric pressure (1.01 bar) | | | |
| T (K) | 1482 | 1368 | 1262 |
| Combustion products present in an amount greater than 1% | | | |
| Nature | | | |
| $N_2$ (g) | 27.8 | 20.8 | 13.8 |
| BN(s) | 27.2 | 42.0 | 56.8 |
| $B_2O_3$(l) | 33.9 | 25.4 | 16.8 |

TABLE 3

Polyaminoborane/strontium nitrate compound

| Compound of the invention | Percentage by weight | | |
|---|---|---|---|
| Polyaminoborane | 60 | 70 | 80 |
| Strontium nitrate | 40 | 30 | 20 |
| Combustion temperature at atmospheric pressure (1.01 bar) | | | |
| T (K) | 1562 | 1412 | 1283 |
| Combustion products present in an amount greater than 1% | | | |
| Nature | | | |
| $N_2$ | 13.9 | 10.4 | 6.9 |
| BN(s) | 36.3 | 48.8 | 61.3 |
| $B_2O_3$(l) | 21.0 | 15.9 | 10.5 |
| SrO(s) | 19.6 | 14.7 | 9.8 |

TABLE 4

Polyaminoborane/vanadium oxide compound

| Compound of the invention | Percentage by weight | | |
|---|---|---|---|
| Polyaminoborane | 60 | 70 | 80 |
| Vanadium oxide | 40 | 30 | 20 |
| Combustion temperature at atmospheric pressure (1.01 bar) | | | |
| T (K) | 1101 | 1092 | 1085 |
| Combustion products present in an amount greater than 1% | | | |
| Nature | | | |
| $N_2$ | 4.0 | 3.0 | 1.9 |
| BN(s) | 44.5 | 55.0 | 65.4 |
| $B_2O_3$(l) | 9.9 | 7.4 | 4.8 |
| $V_2O_3$(s) | 33.0 | 24.7 | 16.5 |

TABLE 5

Polyaminoborane/ammonium dinitramine compound

| Compound of the invention | Percentage by weight | | |
|---|---|---|---|
| Polyaminoborane | 60 | 70 | 80 |
| ADN | 40 | 30 | 20 |
| Combustion temperature at atmospheric pressure (1.01 bar) | | | |
| T (K) | 1741 | 1577 | 1399 |
| Combustion products present in an amount greater than 1% | | | |
| Nature | | | |
| $HBO_2$ | 2.2 | / | / |
| $N_2$ | 29.8 | 22.3 | 14.8 |
| BN(s) | 30.8 | 44.6 | 58.5 |
| $B_2O_3$(l) | 26.0 | 21.1 | 14.3 |

Generally, the above calculations demonstrate a potential mass yield of 7% to 12% equivalent to a molar yield of 35 mol/kg to 60 mol/kg of compound.

IB. EXAMPLE OF THE PREPARATION AND EVALUATION OF A COMPOUND OF THE INVENTION

Within the context of this example, the nature and the amount of gases formed by the combustion of a compound of the invention, denoted as compound A and presented in table 3 above (based on polyaminoborane and on strontium nitrate, in the following respective weight proportions: 60%/40%), were evaluated.

a) The aminoborane polymer (polyaminoborane) $(NH_2BH_2)_x$ was obtained by carrying out a heat treatment of a sample of borazane by heating at 373 K±1 K for 24 h.

The elemental analysis of the polymer obtained led to the following results:

| Elemental analysis | Theoretical expected value |
|---|---|
| Amount of boron: 37.2% | (37.5%) |
| Amount of nitrogen: 40.7% | (48.3%) |
| Amount of hydrogen: 13.3% | (13.7%) |

The smaller proportion of nitrogen analyzed relative to the expected value stems from the method of analysis according to which some of the nitrogen is trapped in the formation of boron nitride BN.

Analysis by differential scanning calorimetry ("DSC") of the aminoborane polymer obtained shows a decomposition of said polymer between 373 K and 503 K (peak onset at 409 K).

The hygroscopy of the polyaminoborane obtained, that is incorporated in the formulation of compound A of the invention, was compared to that of $NaBH_4$, that is incorporated in the formulations of compounds described in the prior art (see compound B below). After 25 minutes of exposure to humidity (relative humidity of 30%), the aminoborane polymer of the invention saw its weight increase by a factor of 1.2; a much lower rate than that of $NaBH_4$, which saw its weight increase by a factor of 5.

b) Sensitivity tests were carried out on beds of powder of compound A of the present example. The results obtained are compared to those obtained with beds of powder of a compound B of the prior art, comprising a mixture of 60% of $NaBH_4$ and 40% of $Sr(NO_3)_2$ (% by weight).

The compound A of the invention proves to be less sensitive in the tests of sensitivity to impact (*) and of sensitivity to friction (**) than the compound B of the prior art.

TABLE 6

|  | Compound | |
| --- | --- | --- |
|  | B (prior art) | A (invention) |
| Sensitivity to impact | 6.8 J | 2 positive tests out of 30 at 50.1 J |
| Sensitivity to friction | 23 N | 1 positive test out of 30 at 353 N |

***: Sensitivity to Impact:

The test carried out corresponds to that described in the standard NF T 70-500, which is itself similar to the UNO 3a)ii) test from the "Recommendations on the Transport of Dangerous Goods—Manual of Tests and Criteria, fourth revised edition, ST/SG/AC.10/11/Rev.4, ISBN 92-1-239083-8 ISSN 1014-7179". Through a minimum series of 30 tests, the energy is determined that leads to 50% (Bruceton method of processing the results) of positive results for an explosive material subjected to the impacts of a hammer. The material to be tested is enclosed in a steel device composed of two rollers and a guide ring. By modifying the weight and the drop height of the hammer, it is possible to vary the energy from 1 to 50 J. Considering the small amount of material available for some of the products tested, for said products only a reduced number of reproducibility tests were carried out compared to the recommendations of the NF T 70-500 standard.

****: Sensitivity to Friction:

The test carried out corresponds to that described in the standard NF T 70-503, which is itself similar to the UNO 3b)ii) test. Through a minimum series of 30 tests, the force that leads to 50% of positive results for an explosive material is subjected to a friction as determined using the Bruceton method. The material to be tested is placed on a porcelain plate of defined roughness, driven with a single reciprocating motion having an amplitude of 10 mm and a speed of 7 cm/s, with no load, relative to a porcelain pin resting on the material. The force applied to the porcelain pin which is pressed against the material may vary from 7.8 to 353 N. Considering the small amount of material available for some of the products tested, for said products only a reduced number of reproducibility tests were carried out compared to the recommendations of the NF T 70-503 standard.

c) The combustion tests were carried out with charges of compound A of the invention in the form of pellets. The diameter of the pellets is 13 mm, their thickness is around 6 mm and their mass is around 1 g. The charge is constituted of three pellets, i.e. around 3 g of product.

The charge is placed in a gas generator equipped with a pressure control valve that makes it possible to maintain the pressure at a sufficient level to ensure the most complete combustion possible. This type of generator is especially described in patent application EP 1 496 332. The generator discharges the combustion gases into a tank equipped with means for analyzing the gases.

In order not to generate other parasite combustion species, the ignition of the charge in the gas generator is carried out by means of a hot wire, welded to the terminals of a sealed bushing.

The combustion of the charge is carried out at a pressure of 12 bar. The results of combustion tests lead to combustion gases containing between 70% and 90% hydrogen and 11% to 25% nitrogen (% by weight). The residual unburnt mass of the charge varies from 24% to 33% (% by weight).

II. EXAMPLES OF COMPOSITIONS ACCORDING TO THE INVENTION (CONTAINING BORAZANE)

TABLE 1

| Borazane/strontium nitrate/iron oxide compound | | | | |
| --- | --- | --- | --- | --- |
| Compound of the invention | Percentage by weight | | | |
| Borazane | 60 | 70 | 80 | 85 |
| Strontium nitrate | 40 | 30 | 20 | 10 |
| Iron oxide | 0 | 0 | 0 | 5 |
| Combustion temperature at atmospheric pressure (1.01 bar) T (K) | 1353 | 1209 | 1088 | 978 |
| Gas yield (mol/kg) | 63.3 | 71.7 | 80.2 | 84.1 |
| % by weight of $H_2(g)$ | 11.7 | 13.7 | 15.6 | 16.6 |

The mass yield of hydrogen varies from 11% to 17% for moderate combustion temperatures, between 900 K and 1400 K. The gas yield of the compositions varies from 60 to 85 mol/kg.

The invention claimed is:

1. A solid compound capable of generating hydrogen by a self-sustaining combustion reaction, a composition of the solid compound comprising: at least one of borazane and polyaminoborane; and at least one inorganic oxidant, wherein when borazane is present and polyaminoborane is not present, the at least one inorganic oxidant comprises strontium nitrate.

2. The solid compound according to claim 1, wherein the at least one inorganic oxidant is chosen from ammonium nitrate, alkali metal nitrates, alkaline-earth metal nitrates, metal nitrates, metal oxides, oxidants from the family of dinitramines and mixtures thereof.

3. The solid compound according to claim 1, wherein the at least one inorganic oxidant is chosen from:
   ammonium, potassium and strontium nitrates;
   iron, vanadium and magnesium oxides;
   ammonium dinitramine; and
   mixtures thereof.

4. The solid compound according to claim 1, wherein the polyaminoborane is obtained by thermal decomposition of solid borazane.

5. The solid compound according to claim 1, wherein the composition comprises said at least one of borazane and polyaminoborane, on the one hand, and said at least one inorganic oxidant, on the other hand, in a weight ratio between 1 and 5.

6. The solid compound according claim 1, wherein the composition is free of organic matter.

7. The solid compound according to claim 1, wherein said at least one of borazane and polyaminoborane and said at least one inorganic oxidant represent at least 90% by weight of the weight of said compound.

8. The solid compound according to claim 1, wherein said at least one of borazane and polyaminoborane and said at least one inorganic oxidant represent substantially 100%, by weight of the weight of said compound.

9. The solid compound according to claim 1, wherein the solid compound is in the form of a grain, a pellet or a block.

10. A pulverulent solid composition, as a precursor of a compound according to claim 1, wherein the pulverulent solid composition contains: at least one of borazane and polyaminoborane; and at least one inorganic oxidant, wherein when borazane is present and polyaminoborane is not present, the at least one inorganic oxidant comprises strontium nitrate.

11. A process for generating hydrogen that comprises the self-sustaining combustion of at least one solid compound, characterized in that said at least one solid compound is a solid compound according to claim 1.

12. The process for generating hydrogen according to claim 11, characterized in that it also comprises the decomposition of at least one additional charge containing borazane and/or polyaminoborane by heat exchange with the hot gases generated by the self-sustaining combustion of said at least one solid compound.

13. The process according to claim 11, characterized in that it is carried out in order to supply a proton exchange membrane fuel cell with hydrogen.

14. The solid compound according to claim 5, wherein the composition comprises said at least one of borazane and polyaminoborane, on the one hand, and said at least one inorganic oxidant, on the other hand, in a weight ratio between 1.5 and 4.

15. The pulverulent solid composition according to claim 10, wherein said at least one inorganic oxidant is chosen from ammonium nitrate, alkali metal nitrates, alkaline-earth metal nitrates, metal nitrates, metal oxides, oxidants from the family of dinitramines and mixtures thereof.

\* \* \* \* \*